United States Patent
Felden et al.

(10) Patent No.: US 9,566,540 B2
(45) Date of Patent: Feb. 14, 2017

(54) METHOD AND DEVICE FOR CENTRIFUGATION AND FILTRATION

(75) Inventors: Luc Felden, Andolsheim (FR); Sebastien Jouette, Molsheim (FR)

(73) Assignee: EMD Millipore Corporation, Billerica, MA (US)

( * ) Notice: Subject to any disclaimer, the term of this patent is extended or adjusted under 35 U.S.C. 154(b) by 589 days.

(21) Appl. No.: 14/003,833

(22) PCT Filed: Mar. 28, 2012

(86) PCT No.: PCT/US2012/030819
§ 371 (c)(1),
(2), (4) Date: Oct. 23, 2013

(87) PCT Pub. No.: WO2012/135264
PCT Pub. Date: Oct. 4, 2012

(65) Prior Publication Data
US 2014/0051564 A1    Feb. 20, 2014

(30) Foreign Application Priority Data

Mar. 29, 2011   (EP) .................................... 11290156

(51) Int. Cl.
*B01D 21/26*    (2006.01)
*B01D 17/02*    (2006.01)
(Continued)

(52) U.S. Cl.
CPC ......... *B01D 21/262* (2013.01); *B01D 17/0217* (2013.01); *B01D 17/085* (2013.01);
(Continued)

(58) Field of Classification Search
CPC ... B01D 17/0217; B01D 17/085; B01D 61/18;
B01D 63/16; B01D 71/34; B01D 21/262;
B01D 2315/02; B04B 5/04; B04B 5/0407;
B04B 5/0414; B04B 2005/0435; B04B 2005/0485
(Continued)

(56) References Cited

U.S. PATENT DOCUMENTS

| 3,969,250 A | * | 7/1976 | Farr ....................... B01D 33/01 210/359 |
| 3,970,565 A | * | 7/1976 | Ahlstrand ............. B01D 33/01 210/359 |

(Continued)

FOREIGN PATENT DOCUMENTS

| EP | 0294185 A2 | 12/1988 |
| EP | 2065062 A1 * | 6/2009 ........ A61M 5/14216 |

(Continued)

OTHER PUBLICATIONS

International Search Report received for PCT Patent Application No. PCT/US2012/030819, mailed on Sep. 12, 2012, 4 pages.
(Continued)

*Primary Examiner* — Charles Cooley
*Assistant Examiner* — Shuyi S Liu
(74) *Attorney, Agent, or Firm* — EMD Millipore Corporation

(57) ABSTRACT

The invention provides a filtering and centrifugation device, comprising a barrel, a volume in the barrel for receiving a fluid sample to be processed, a filter medium, at least one piston movable in the barrel to force fluid in the volume through the filter medium to produce a filtrate, and a space for pelleting particulate material. The device is centrifugeable, and said space is located in or communicates with the volume and is located preferably away from the filter medium such that the particulate material does not or at least not completely clog the filter medium during such centrifu-
(Continued)

gation of the device. The invention also provides a method for the sterile filtration of a sample, comprising the steps of introducing the sample into the volume of such a device, subjecting the device to centrifugation to pellet particulate material contained in the sample at the space away from the filter medium, and applying force to the piston(s) to force fluid of the sample in the volume through the filter medium to produce a filtrate. By providing the space for pelleting the particulate material under the influence of the centrifugation force, the clogging of the filter medium can be avoided or considerably delayed. Further, the entire process can be performed in the same device without having to remove the sample for any intermediate clarification steps.

15 Claims, 5 Drawing Sheets

(51) Int. Cl.
  *B01D 17/00* (2006.01)
  *B01D 61/18* (2006.01)
  *B01D 63/16* (2006.01)
  *B04B 5/04* (2006.01)
  *B01D 71/34* (2006.01)
(52) U.S. Cl.
  CPC ............ *B01D 61/18* (2013.01); *B01D 63/16* (2013.01); *B01D 71/34* (2013.01); *B01D 2315/02* (2013.01); *B04B 5/04* (2013.01); *B04B 5/0407* (2013.01); *B04B 2005/0435* (2013.01); *B04B 2005/0485* (2013.01)
(58) Field of Classification Search
  USPC .................................. 494/16; 422/500, 533
  See application file for complete search history.

(56) References Cited

U.S. PATENT DOCUMENTS

| | | | |
|---|---|---|---|
| 4,832,850 A | 5/1989 | Cais et al. | |
| 4,859,336 A | 8/1989 | Savas et al. | |
| 5,079,170 A | 1/1992 | Rosman et al. | |
| 5,124,041 A | 6/1992 | Sheer et al. | |
| 5,137,628 A | 8/1992 | Hart et al. | |
| 5,238,003 A | 8/1993 | Baidwan et al. | |
| 5,264,184 A | 11/1993 | Aysta et al. | |
| 5,464,541 A | 11/1995 | Aysta et al. | |
| 5,472,144 A | 12/1995 | McDonald | |
| 5,549,816 A | 8/1996 | Harp et al. | |
| 5,578,201 A | 11/1996 | Collier et al. | |
| 5,605,288 A | 2/1997 | McDonald | |
| 5,620,663 A | 4/1997 | Aysta et al. | |
| 5,658,463 A | 8/1997 | Rubio | |
| 5,667,754 A | 9/1997 | Brayton et al. | |
| 5,683,914 A | 11/1997 | Miller et al. | |
| 5,788,670 A * | 8/1998 | Reinhard ............ | A61M 5/3129 604/191 |
| 5,932,174 A | 8/1999 | Brayton et al. | |
| 5,944,698 A | 8/1999 | Fischer et al. | |
| 6,401,552 B1 * | 6/2002 | Elkins ................. | B01L 3/5021 422/548 |
| 6,478,966 B2 | 11/2002 | Zhou et al. | |
| 6,554,803 B1 | 4/2003 | Ashman | |
| 7,431,837 B2 | 10/2008 | Cohee et al. | |
| 2004/0251217 A1 * | 12/2004 | Leach ................ | B01D 17/0217 210/787 |
| 2009/0097995 A1 * | 4/2009 | Ham ................. | A61M 5/14216 417/419 |

FOREIGN PATENT DOCUMENTS

| | | | | |
|---|---|---|---|---|
| WO | | 97/15399 A1 | 5/1997 | |
| WO | WO 03099412 A1 * | | 12/2003 | ......... B01D 17/0217 |
| WO | | 2010/122548 A2 | 10/2010 | |

OTHER PUBLICATIONS

Whatman, "Autovial Syringeless Filters", available online at <http://www.whatman.com/Autovial.aspx> retrieved on Sep. 10, 2013, 3 pages.

Whatman, "UniPrep Syringeless Filters", available online at <http://www.whatman.com/UniPrep.aspx> retrieved on Sep. 10, 2013, 2 pages.

Whatman, "Mini-UniPrep Syringeless Filters", available online at <http://www.whatman.com/MiniUniPrep.aspx> retrieved on Sep. 10, 2013, 7 pages.

International Preliminary Report on Patentability received for PCT Patent Application No. PCT/US2012/030819, mailed on Oct. 10, 2013, 9 pages.

* cited by examiner

METHOD AND DEVICE FOR CENTRIFUGATION AND FILTRATION

CROSS-REFERENCED TO RELATED APPLICATIONS

The present application is a U.S. National, Stage Application of International Application No. PCT/US2012/030819, filing date Mar. 28, 2012, which claims the benefit of priority of European Patent Application No. 11290156.6, filing date Mar. 29, 2011, each of which is incorporated by reference herein in its entirety.

The present invention relates to a method and a device for processing samples by centrifugation and filtration.

BACKGROUND OF THE INVENTION

Researchers, especially in the biotech field, frequently need to know if a bioreactor of a specific setup will produce the desired final product.

Due to an occasionally high particulate content of a bioreactor sample, the sample is currently clarified in the lab by multiple centrifugations. Subsequently, in order to simulate a sterile final product, the supernatant is filtered in a separate device. At this step it is possible to use a 0.22 µm filter membrane (i.e. a MILLEX™ 0.22 µm membrane from MILLIPORE) combined with a syringe. Assuming that the filter membrane is not clogging, the maximum processed volume is the volume of the syringe which is typically 50 ml.

Furthermore, this process is a multi-step protocol where the personnel has to walk several times to the centrifuge and a laminar flow hood, and it is an "open" protocol which increases the risk of contamination of the sample.

One current approach to reduce the number of steps is co use so called "syringeless filters" commercially available from WHATMAN under the tradenames UNIPREP™ and AUTOVIAL™.

Autovial™ syringeless filters are preassembled filtration devices fox removing particulates from samples. They replace syringe-coupled filtration devices with single, disposable units. These devices are comprised of two parts; a graduated filter barrel and a plunger. The design features an integral filter, built-in air purge and a support stand that protects a recessed slip-luer tip. The devices are available in a 5 ml and 12 ml volume capacity.

The filter is selected according to membrane compatibility with the sample. In practice, the sample is poured into the 5 ml or 12 ml capacity filter barrel. The plunger is inserted into the barrel until the bottom is securely in place; there is a gap of air between the sample and plunger. Then, the tip of the device is placed into the mouth of an autosampler vial or container and the plunger compressed. Filtration begins immediately and, as the plunger is compressed until it reaches the bottom, the membrane is purged with air for maximum sample recovery. For direct instrument injection, a needle is placed on the slip-luer outlet.

UniPrep™ syringeless filters are preassembled filtration devices, too, for the filtration and storage of laboratory samples. These devices include a plunger, filter and vial in one unit. They replace syringe-coupled filtration devices with single, disposable units. These devices consist of two parts: a test tube and a filter-plunger where a membrane is mounted into the tip of the plunger. When the filter plunger is pressed through the liquid placed in the test tube, positive pressure forces the filtrate up into a reservoir of the filter-plunger. The devices can be used to filter only small sample volumes in the range from 1 to 5 ml.

A still further range of products are available under the name Mini-UniPrep™ which is a preassembled filtration device consisting of a 0.4 ml capacity chamber and a plunger. The plunger contains a filtration membrane at one end and a preattached cap/septum at the other. The plunger is pressed through the sample in an outer chamber and positive pressure forces the filtrate into a reservoir of the plunger. Air escapes through a vent hole. The device can be used either individually manually or with a manually operated compressor unit which comprises a manually operated lever that can be pressed on up to 6 samples standing on a base. This device is designed to fit into an autosampler accommodating 12×32 mm vials. Alternatively the septum can be pierced with a needle and the sample drawn off for manual injection into an analyzer.

Filter membranes of such devices are typically made from the following materials depending on the intended sample to be processed: cellulose acetate (CA) (a low nonspecific protein binding and high loading capacity membrane for biological solutions), glass microfiber (GMF) (a depth filter for samples in aqueous or organic solutions), nylon (NYL) (for aqueous and organic samples within a pH range between of 3 to 10), polyethersulfone (PES) (a low non-specific protein binding membrane for samples in aqueous solutions), polypropylene (PP) (a hydrophobic membrane which is resistant to a wide range of organic solvents), polytetrafluoroethylene (PTFE) (a Teflon® membrane for samples with >50% organic solvent), polyvinylidene fluoride (PVDF) (a low nonspecific protein binding membrane for samples in aqueous solutions and/or organic solvents).

In order to allow the filtration of difficult samples, the design incorporates a glass fiber prefilter. Although these devices are easy to use they are even more limited by the sample size (i.e. only 12 ml maximum) and are subject to the clogging of the final membrane.

U.S. Pat. No. 5,238,003 discloses a manually operable blood drawing syringe having a barrel with a hollow cylindrical bore with an open rear end and a reduced diameter front end for the attachment of a needle. A pushrod is disposed for slidable movement within the barrel and a disc-shaped plunger or piston is attached to the forward end of the pushrod. A filter which will pass air but is impervious to fluids is disposed between forward and rear perforated plates of the plunger and a sealing flange is disposed around the periphery of the plunger and dimensioned to fit slidingly within the cylindrical bore of the barrel. A flapper seal which is impervious to both gas and fluids is located in abutting contact with the rear face of the plunger and allows air that has passed through the filter in the plunger to escape from an upstream volume into a downstream volume as the pushrod and the plunger move forward in the barrel.

EP-A-0294185 discloses a filtering device for fluids which is similar to the above described Autovial™ syringeless filters. It comprises a barrel with an open end sod a flow discharge end with a nipple that is in communication with the interior volume of the barrel. A plunger is slidable disposed in the barrel through the open end towards the discharge end. A filter is disposed adjacent the barrel inwardly of and adjacent to the discharge nipple. In operation the sample fluid to be filtered is poured into the volume of the barrel so as to be disposed above the filter. The plunger is then inserted into the open end of the barrel and pushed towards the flow discharge end. The sample will have been fully filtered and dispensed from the nipple when the plunger is fully depressed and the forward face of the plunger engages a bottom end of the barrel. This device suffers from the premature clogging of the membrane surface if samples with a larger particulate material load are to be processed.

WO 97/15399 discloses a portable and disposable centrifugal cell separation device for biological fluids like blood. The device comprises a hollow centrifugal processing chamber rotatable about an axis of rotation and having a common axial inlet/outlet port for the fluid to be processed. The processing chamber contains a movable plunger which defines a separation space of variable size and a vacuum/pressure space and being movable to intake the selected quantity of a sample fluid into the separation space via the inlet/outlet port, and to express processed sedimented fluid components after centrifugation from the separation space via the inlet/outlet port. The plunger is moved towards the inlet/outlet port end of the processing chamber by pressurized air introduced into the vacuum/pressure space.

OBJECT OF THE INVENTION

The object of the invention is to provide a method and a device for processing samples, especially such that are difficult to filter due to a complex matrix like samples from bioreactors, by centrifugation and filtration in a sterile environment and in a more effective manner.

Further aspects of the invention are to provide such a method and device which are suitable to process larger volumes of such samples than in the prior art in a lab, and which can use conventional benchtop centrifuges available in many labs.

Further advantages and features of the invention will become apparent from the following description of preferred embodiments.

According to the present invention there is provided a filtering and centrifugation device as defined in claim 1 and a method for the sterile filtration of a sample as defined in claim 14. The invention also provides an apparatus for applying a force to one or more filtering and centrifugation device(s) of the invention as defined in claim 13. Preferred embodiments are defined in the dependent claims.

The filtering and centrifugation device of the invention comprises a barrel, a volume in the barrel for receiving a fluid sample to be processed, a filter medium, and at least one piston movable in the barrel to force fluid in the volume through the filter medium to produce a filtrate. A space is provided for pelleting particulate material, wherein said space is located in or communicates with the volume such that the particulate material does not clog or will at least not completely clog the filter medium during centrifugation of the device.

Preferably the space for accommodating the particulate material and is located away from said filter medium and preferably comprises a recess for accommodating the particulate material.

The method for the sterile filtration of a sample of the invention comprises the steps of introducing the sample into the volume of such a device of the invention, subjecting the device to centrifugation to pellet particulate material contained in the sample at the space away from the filter medium, and applying force to the piston(s) to force fluid of the sample in the volume through the filter medium to produce a filtrate.

By providing the space for pelleting the particulate material of the solution to be processed under the influence of the centrifugation force applied on the device prior or simultaneously with the application of the pressure applied through the piston(s) to force the fluid through the filter medium, the clogging of the filter medium can be avoided or considerably delayed. Further, the entire process can be performed in the same device without having to remove the sample for any intermediate clarification steps.

The device and method of the invention can be advantageously used for the filtration and concentration of complex matrices like in sample preparation (prior to preparative HPLC), for processing difficult-to-filter samples in general, for the quick filtration of large volume samples, for the extraction/concentration of proteins, and for the desalting and solvent exchange. The principles of the invention can be applied for even more large scale or industrial dimensions by increasing the volume in the barrel for the sample to be processed and/or the number of pistons/filter media integrated into the barrel and/or the number of barrels processed at the same time.

DETAILED DESCRIPTION OF PREFERRED EMBODIMENTS

Figure 1:
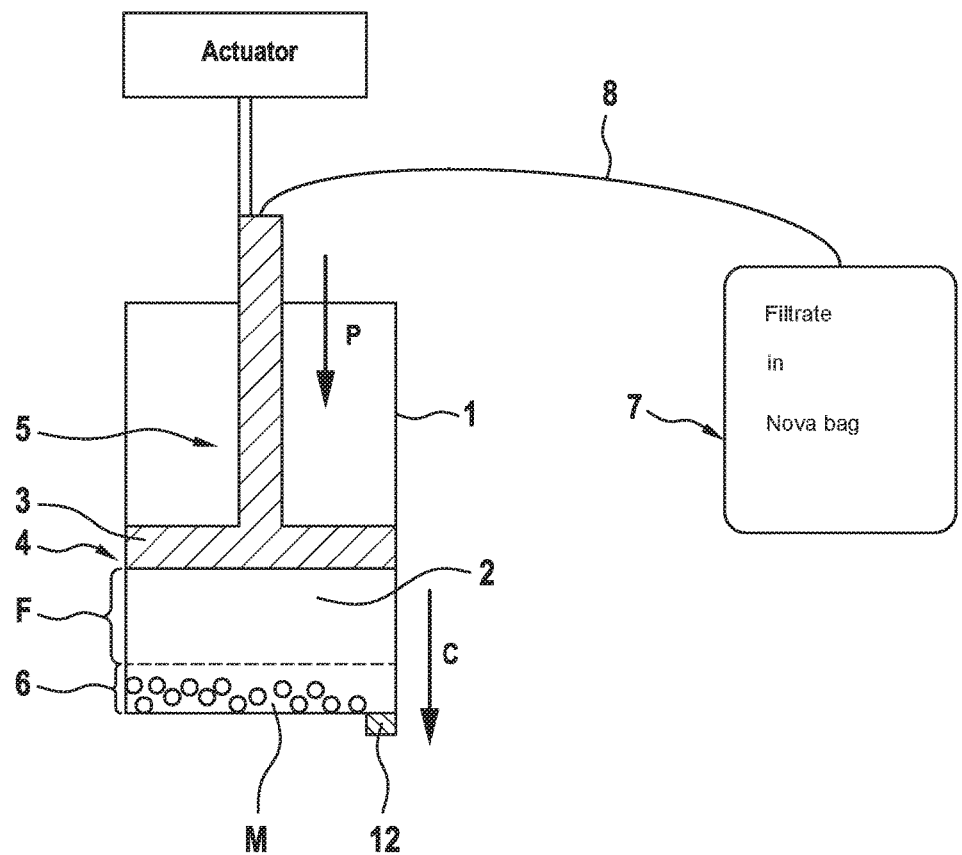
FIG. 1 is the schematic representation of a first embodiment of the filtering and centrifugation device of the invention.

The FIG. 1 shows a schematic layout of a basic embodiment of the filtering and centrifugation device of the present invention. The device comprises a cylindrical barrel 1 in which a piston or plunger 3 is movably received. A filter medium 4, preferably including one or more filter membranes, is attached to the plunger 3. Below the filter medium 4 is a volume 2 for receiving a fluid sample to be processed. Moving of the piston from an upper position towards a lower position in the vertical downward direction (pressing direction P) forces fluid in the volume 2 through the filter medium to produce a filtrate that is guided through a push rod 5 of the piston and a conduit 8 to an external receptacle 7, preferably in the form of a closed unit like a flexible bag (i.e. a NovaSeptum® bag). The extracting of the filtrate through the push-rod is a preferred example but a separate channel or flow path can be provided as well.

At the bottom end of the volume in the barrel for receiving the fluid sample is a space 6 for pelleting particulate material when the entire device is subjected to centrifugation. The centrifugation, i.e. the centrifugation force component C in the direction of the axial length of the piston will force the particulate material M in the fluid to be processed towards the space 6 in the direction of centrifugation force C. Accordingly, the filter medium 4 will be exposed only to the clarified fluid F whereas the pelleted particulate material in the space is located away from the filter medium. This has the consequence that the filtering of the clarified fluid by pressing the piston an the direction P will not clog the filter medium.

The centrifugation of the device can be effected in a conventional bench top centrifuge, for example one with a 750 ml swing-round-bucket or in fixed angle rotors with appropriate dimensions. The device of FIG. 1 could, however, also be subjected to centrifugation in a mainly horizontal orientation as shown in FIG. 2 and in this case the centrifuge could be a bench top centrifuge with a 96-well plate rotor, for example.

Although not shown in FIG. 1 the space for pelleting the particulate material during the centrifugation step can preferably but does not necessarily have to be a dedicated space or recess for accommodating the particulate material at the bottom and/or a periphery of the barrel. The space can be located in the volume for receiving the fluid sample but can also be a space or recess that communicates with the volume. The space or recess can be additionally preferably separated from the rest of the volume by a separation structure in the form of a grid or coarse net-like structure or the like designed to let the particulate material and fluid sample pass.

In addition, a port can be provided for allowing removal of the particulate material from the space.

The size of the volume in the barrel for receiving the fluid sample to be processed can be considerably larger than in the prior art, i.e. at least 5 ml, preferably at least 150 ml or further preferably at least 200 ml.

Figure 2A:
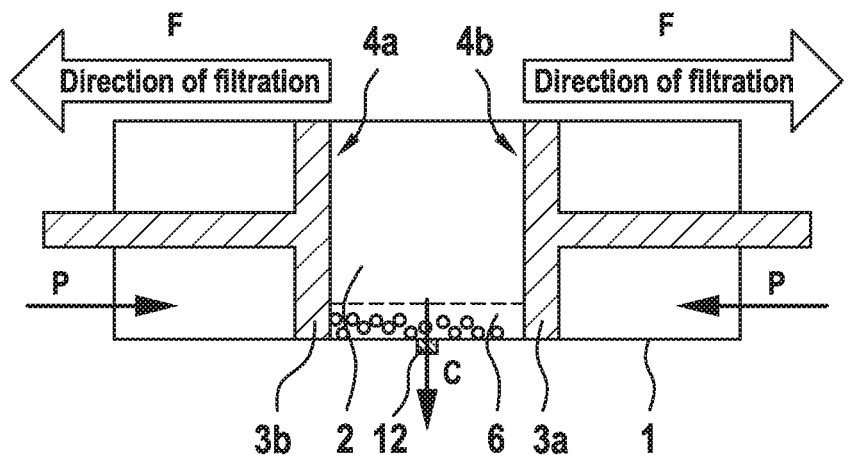
FIG. 2 is a schematic representation of two alternatives of a second embodiment of the filtering and centrifugation device of the invention.
Figure 5:
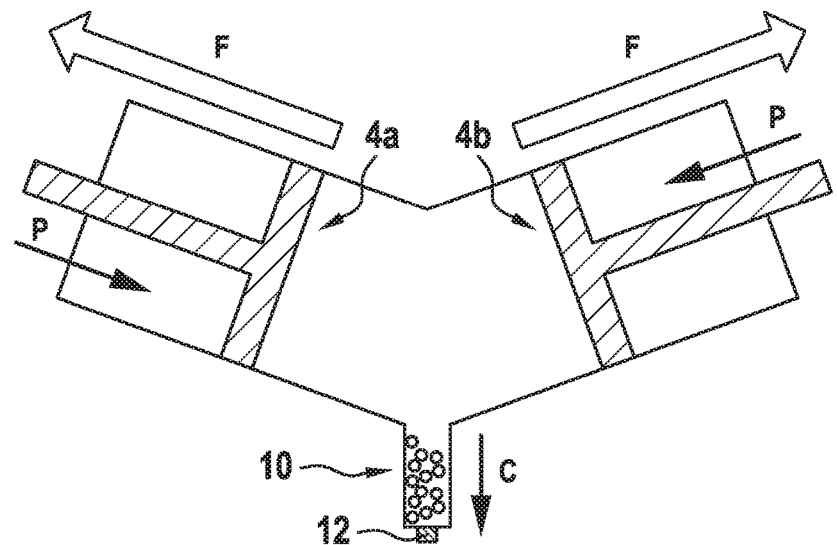
FIG. 5 is a still further modification of the embodiment of FIG. 3 with a separate space as concentration area in the form of a recess.

FIG. 2A shows an embodiment having two pistons $3a$, $3b$ in an elongated cylinder barrel 1. This allows to double the filtration area and to increase the size of the volume in the barrel for receiving the fluid sample without having to necessarily increase the stroke length of the piston in case of a single-piston device. As illustrated below in connection with FIGS. 5 and 6 a dedicated recess can be provided at the lower portion of the volume to serve as a space for accommodating the particulate material pelletized during centrifugation at a position even further away from the filter media 4. In the embodiment shown in FIG. 2A there could be a certain contact of particles pelletized in consequence of the centrifugation with part of the membranes. However, during the filtration process, when the pistons come closer to each other, there is always an area of the membrane that is never in contact with the pelletized particles and remains essentially unobstructed.

Figure 3:
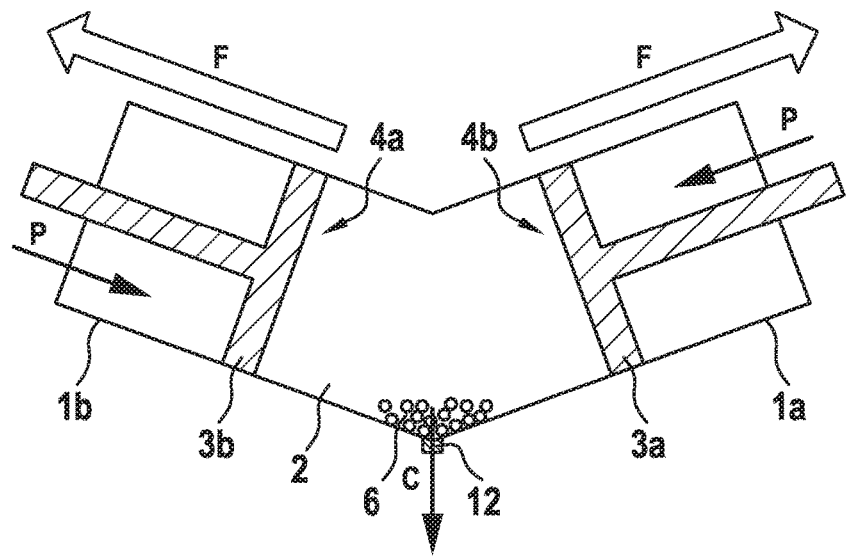
FIG. 3 is a modification of the embodiment shown in FIG. 2 with inclined cylinders for the two pistons.

In order to prevent substantial contact of the filter media with the pelleted particles and to consequently delay or avoid the clogging of the filter media, the barrel could, as shown in FIG. 3, comprise two cylinder sections $1a,1b$ which respectively receive one of the pistons $3a,3b$. As shown in FIG. 3 the two cylinder sections of the barrel are inclined relative to each other with the volume 2 for receiving the fluid sample to be processed therebetween and with the space 6 for accommodating the pelletized particulate material located at the apex at the lower central portion of the device.

Figure 4:
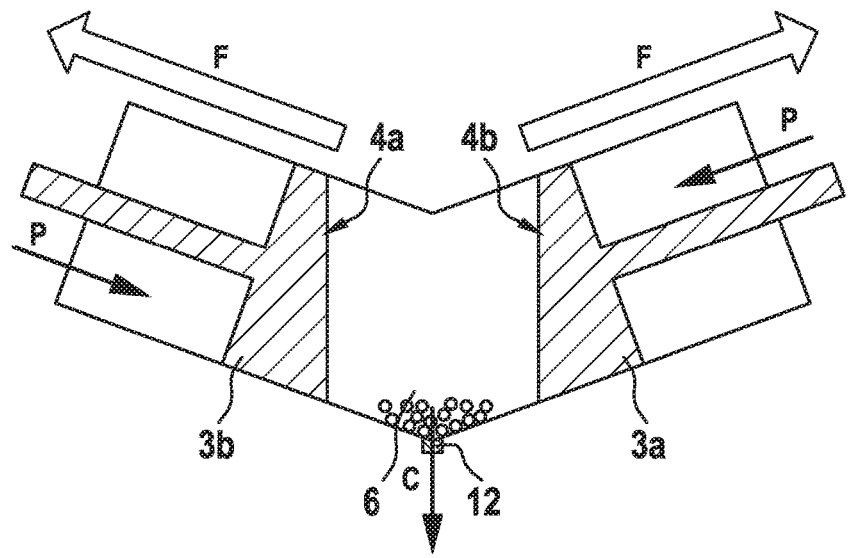
FIG. 4 is a further modification of the embodiment of FIG. 3 with modified pistons offering no dead volume.

In order to reduce the dead volume due to the V-shape, the filter media $4a,4b$ could stay vertically as shown in the horizontal orientation of FIG. 4 (and in consequence parallel to each other) by inclining the bottom portion or pressurizing face of the pistons according to the inclination angle between the cylinders.

Figure 6:
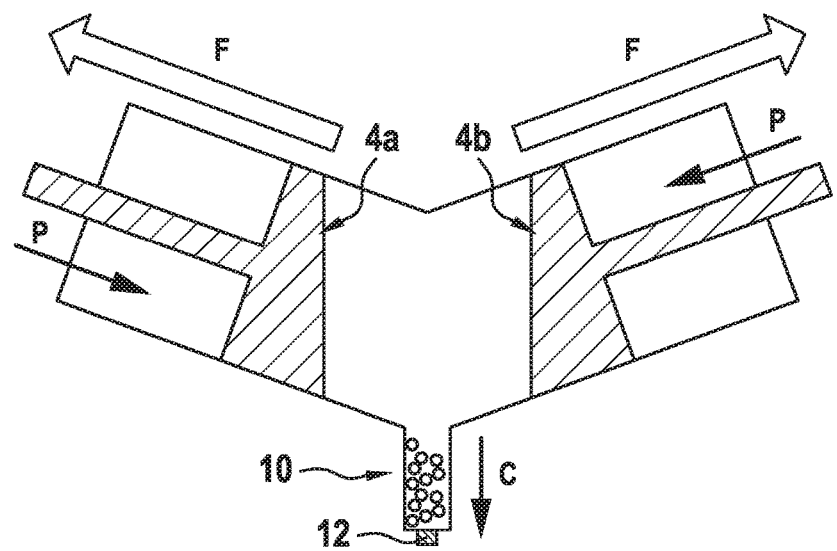
FIG. 6 is a still further modification of the embodiment of FIG. 3 combining the aspects of the picture offering no dead volume with the provision of the separate space as concentration area.

In this embodiment, too, a dedicated recess or concentration area 10 can be provided as the space for pelleting the particulate material as exemplified in FIG. 6 and this concentration area can be provided with or communicate with a port 12 for removing the particulate material.

Figure 2B:
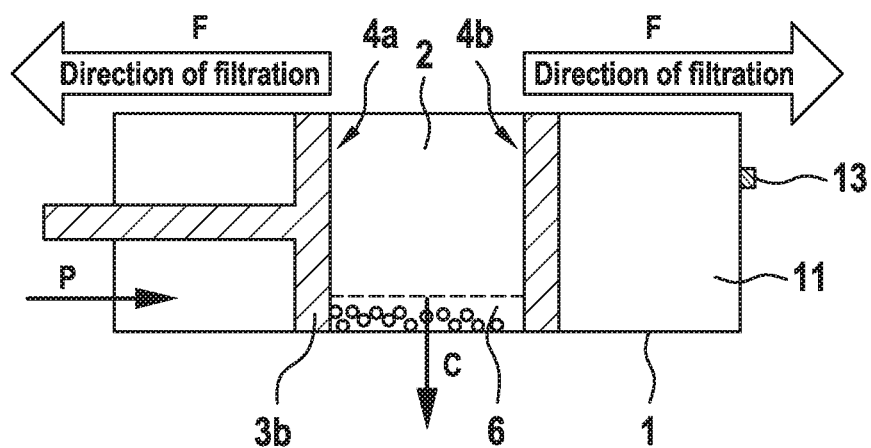

In the shown embodiments the filter medium, preferably in the form of one or more filter membranes, is provided at the piston(s), respectively. Accordingly, the fluid forced through the filter media, i.e. the filtrate, is guided through the push rod(s) of the piston(s) and a conduit to one or several closed external unit(s) as schematically shown in FIG. 1. As shown in FIG. 2B the filter medium could be alternatively located at the bottom of the barrel (replacing for example the right piston of the embodiment of FIG. 2A by a fixed support structure holding the filter medium) so that the fluid would be forced through the filter medium into another volume 11 downstream of that filter medium or directly to an outlet port. The filtrate could be retained in this volume and removed subsequently or again directly extracted from there through a conduit into an external unit.

For that purpose a port 13 can be provided which is to communicate with the downstream side of the filter medium and connected to or connectable to the external fluid receptacle (FIG. 2B).

In operation and according to the method of the present invention for a sterile filtration of a sample, the sample to be processed is introduced into the volume 2 of the device as described above. Then, the entire device is subjected to centrifugation force C (i.e 500 g or more, preferably 1000 g or more and typically up to 4000 g), in a direction depending on the layout of the device, thereby pelleting the particulate material contained in the sample at the space 6 in the volume away from the filter medium.

Depending on the direction of application of the centrifugal force and especially depending on the orientation of the device in relation to the centrifugation axis there could act a certain centrifugation force component on the piston forcing it to move within the cylinder. If such a movement is to be avoided either the frictional resistance between the piston and the cylinder can be set appropriately, or means can be provided to hold the piston in place despite of the centrifugation force, i.e. in the form of engaging recesses/protrusions or a breakable connection between the piston and cylinder.

By applying a force P to the piston(s) the friction or holding force of the piston can be overcome and the fluid of the sample in the volume is forced through the filter medium 4 in the direction F of filtration, thereby producing the desired filtrate.

The application of the force to the pistons to force the fluid through the filter medium can be applied sequentially after the centrifugation or can be applied simultaneously with the centrifugation.

After the desired filtrate has been collected in a separate volume within the barrel or extracted into an external receptacle, the particulate material collected at the space can be either retained in the device and discarded with it or extracted as well, preferably through the dedicated port communicating with the space where the particulate material is accommodated.

The benefit of the method and device of the present invention is to mimic all downstream processing steps previously done in the lab at different locations or in repeated steps with only a single device in a shorter period of time. The device and method of the invention provide a possibility to produce a final sterile product in large volumes from a large volume bioreactor sample.

In order to apply the force P on the one or more piston(s) of the filtering and centrifugation device of the invention, an apparatus can be envisaged which can accommodate one or more of the filtering and centrifugation device(s). Such an apparatus comprises an electrical, pneumatic or mechanical actuator for moving the one or more piston(s) in the barrel of the respective device(s) to force the fluid through the respective filter media. The use of such an electrical, pneumatic or mechanical actuator provides the advantage that a sufficiently large force or pressure P (i.e. 10 bar or more) can be applied in a constant, repeatable and controlled manner, or, if desired, in a predefined application pattern over time, for example in that the actuator is controlled by a predefined program.

Further, such actuators provide a sufficiently large force to process the large volumes for which the device of the present invention is designed.

The filter media are to be selected such that they are compatible with the specific sample types to be processed and structured to produce the desired filtrate from it. One example is the use of a 0.22 µm filter membrane (i.e. a Durapore® sterilizing-grade 0.1 µm and 0.22 µm hydrophilic polyvinylidene fluoride (PVDF) membrane from MILLIPORE) that is also used in the open protocol described in the introduction portion. Further, the filter media as described in connection with the filter membranes of the WHATMAN devices on page 3 of the description can be alternatively used.

Still further, a stacked membrane could be employed with one or more clarification membrane(s) i.e. AN3H & AN50 from MILLIPORE) placed before the sterilizing-grade membrane. The stacked membrane configuration further reduces the early clogging of the sterilized-grade membrane.

The filter media is dependant on the application, i.e. ultrafiltration for protein concentration or desalt/buffer exchange. In this case, cellulose membranes can be used. Ultrafiltration is a method to concentrate proteins or other macromolecules through a semipermeable membrane with defined pores. Ultrafiltration is applicable for sample desalting, concentrating proteins from dilute solution such as urine samples, or deproteinizing samples with high protein concentration (i.e. blood serum, or plasma).

The device of the invention is a single unit that is convenient to use. The device does not require assembly and is easy to load. If the material chosen for the device is inexpensive, the device may be designed as a disposable unit.

Since the device of the invention can be a self contained device, it eliminates the risk of filter pop-off and is thus ideal also for hazardous samples.

If output ports of the (not shown) of the device are opened, the membrane is venting allowing filling the barrel completely. Nevertheless, by integrating an air purge valve into the device the sample recovery can be further maximized.

If the device is pre-sterilized, sample integrity can be maintained because the sample does not have to be removed for any steps of the processing.

Although only embodiments with two pistons are described, even more than two pistons can be integrated in a barrel, for example in a serial or radial arrangement, wherein the cylinder sections receiving the respective pistons can be inclined relative to each other and, in such case, the membrane surfaces of the pistons can be inclined as well such that the membrane surfaces become parallel to each other as exemplified in FIGS. 4 and 6 above.

Figure 7:
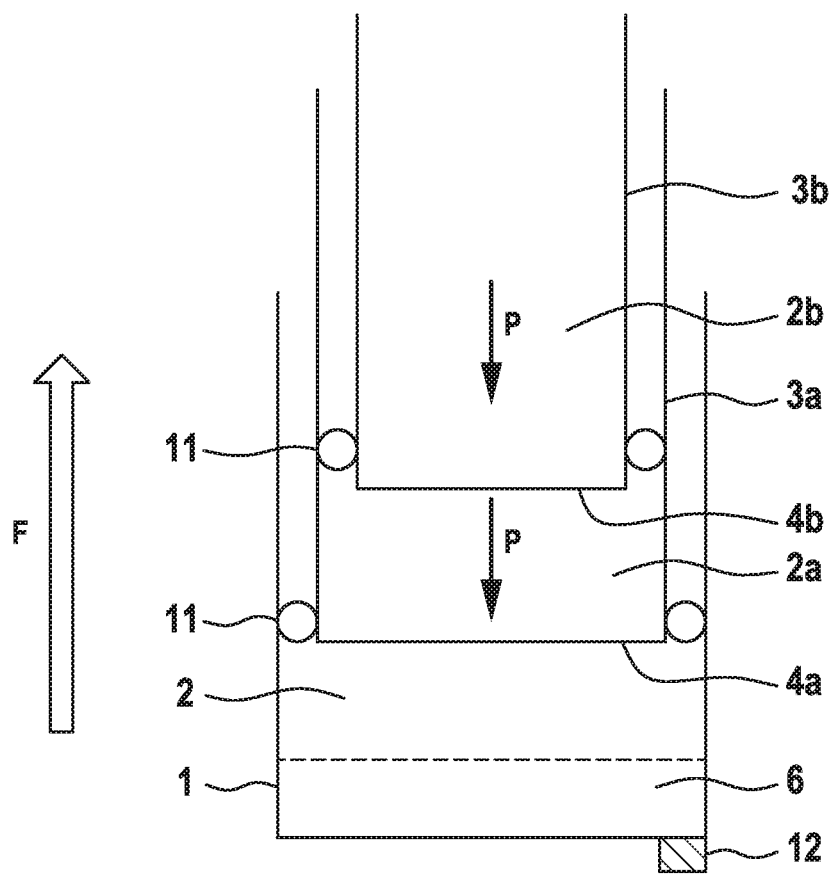
FIG. 7 is a still further modification of the device having a plurality of pistons nested one inside the other.

A still further modification of the filtering and centrifugation device of the invention is shown in FIG. 7. In this modification a plurality of pistons $3a$, $3b$ are nested one inside the other, each piston having a filter medium $4a$, $4b$ provided to its bottom. The filter media can be different from each other in that the filter medium $4a$ of the first piston $3a$ arranged in the barrel 1 providing the volume 2 for receiving the fluid sample to be processed and the space 6 for pelleting the particulate material is selected to be a prefilter membrane whereas the filter medium $4b$ of the second piston $3b$ arranged in a volume of the first piston $3a$ downstream of the filter medium thereof is a filtration membrane (i.e. a sterilizing-grade membrane). Additional pistons with filter media of intermediate porosity can be nested inside the second piston in the same manner with the sterilizing-grade membrane being provided on the most downstream piston. This modification can be an alternative to the stacked membrane design described above providing larger volume on each downstream stage of filtration.

In order to seal each stage from the upstream stage, gaskets 11 or other sealing structures can be provided on each of the nested pistons. Further, the space for pelleting particulate material away from the respective filter medium can be provided not only in or in communication with the volume of the barrel for receiving the sample fluid but also in selected ones of the downstream stages within the pistons.

Application of a force P on the respective pistons will successively force the filtrate from the sample volume 2 in the barrel 1 to the more downstream volumes $2a,2b$.

The invention claimed is:

1. A filtering and centrifugation device, comprising:
   a barrel comprising at least two cylinders and at least two pistons opposed to each other, the two cylinders respectively receiving one of the at least two pistons, wherein the at least two cylinders are inclined relative to each other;
   a volume in the barrel for receiving a fluid sample to be processed, the volume located between the at least two pistons;
   a filter medium;
   at least one piston movable in the barrel to force fluid in the volume through the filter medium to produce a filtrate; and
   a space at an apex of the least two cylinders inclined relative to each other for pelleting particulate material, wherein the device is centrifugeable, and
   wherein said space is located in or communicates with the volume such that the particulate material does not or at least not completely clog the filter medium during such centrifugation of the device.

2. The filtering and centrifugation device according to claim 1, wherein the filter medium includes one or more filter membrane(s).

3. The filtering and centrifugation device according to claim 1, wherein the space for accommodating the particulate material is located away from said filter medium.

4. The filtering and centrifugation device according to claim 1, wherein the space for accommodating the particulate material is located away from said filter medium and comprises a dedicated space or recess for accommodating the particulate material and the recess comprises a communication port for allowing removal of the particulate material.

5. The filtering and centrifugation device according to claim 1, wherein the filter medium is located at the at least one piston.

6. The filtering and centrifugation device according to claim 1, wherein the barrel comprises a second volume on the downstream side of the filter medium arranged to receive filtrate having passed the filter medium.

7. The filtering and centrifugation device according to claim 1, wherein the barrel comprises a second volume on the downstream side of the filter medium arranged to receive filtrate having passed the filter medium and further comprising a port connected or connectable to an external fluid receptacle and communicating with the second volume on the downstream side of the filter medium.

8. The filtering and centrifugation device according to claim 1, wherein the at least one piston cooperates with a pushrod adapted to engage with an external device for applying force to urge the at least one piston.

9. The filtering and centrifugation device according to claim 1, wherein the size of the volume in the barrel for receiving the fluid sample is at least 5 ml.

10. An apparatus for applying a force to one or more filtering and centrifugation device(s) as defined in claim 1 comprising an electrical, pneumatical or mechanical actuator for moving the at least one piston in the barrel of the respective device.

11. A method for the sterile filtration of a sample, comprising the steps:
introducing the sample into the volume of a device as defined in claim 1;
subjecting the device to centrifugation to pellet particulate material contained in the sample at the space away from the filter medium; and
applying force to the at least one piston to force fluid of the sample in the volume through the filter medium to produce a filtrate.

12. The method according to claim 11, further comprising a step of recovering particulate material collected at the space and/or filtrate from the device towards an external receptacle.

13. The filtering and centrifugation device of claim 3, wherein the space for accommodating the particulate material comprises a dedicated space or recess for accommodating the particulate material.

14. The filtering and centrifugation device according to claim 1, wherein the size of the volume in the barrel for receiving the fluid sample is at least 150 ml.

15. The filtering and centrifugation device according to claim 1, wherein the size of the volume in the barrel for receiving the fluid sample is at least 200 ml.

* * * * *